United States Patent Office 2,768,229
Patented Oct. 23, 1956

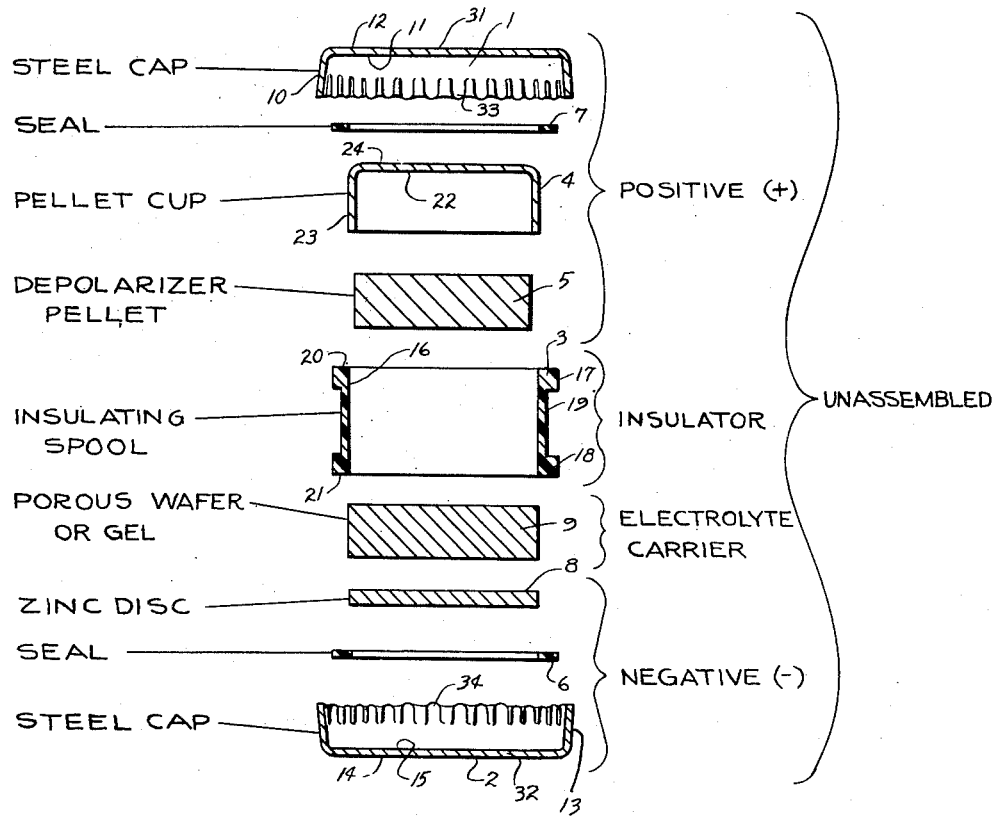
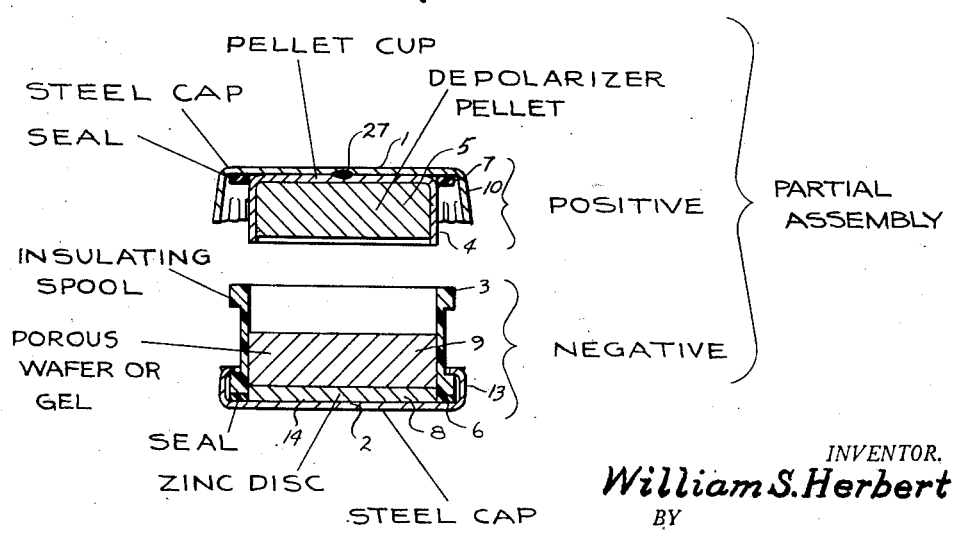

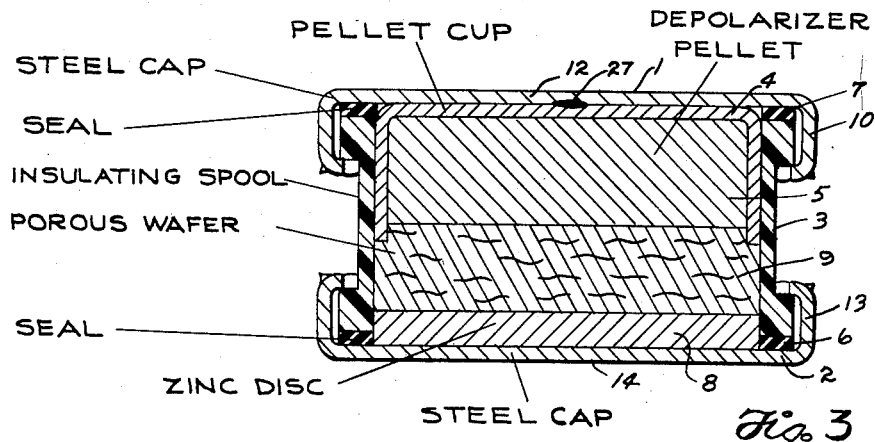
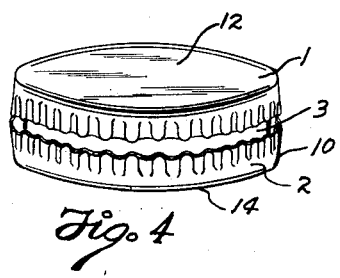
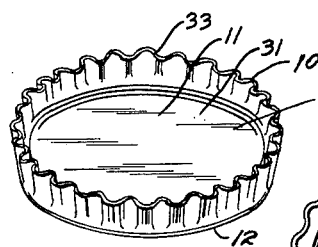
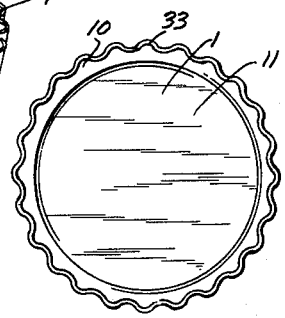
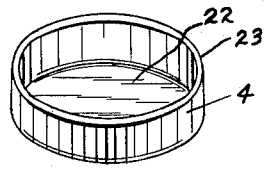
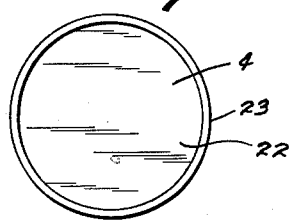
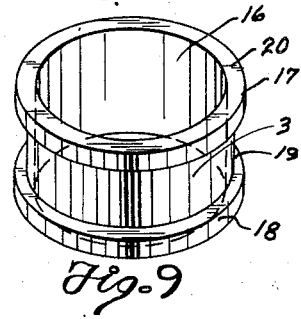
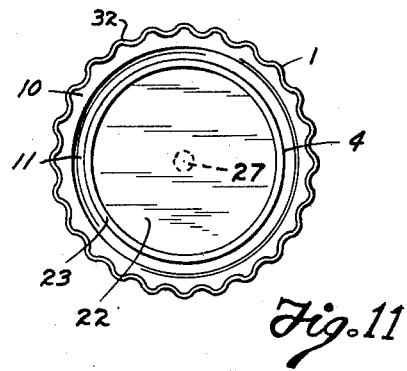

2,768,229

PRIMARY DRY CELL

William S. Herbert, Madison, Wis., assignor to Ray-O-Vac Company, Madison, Wis., a corporation of Wisconsin Application August 31, 1953, Serial No. 377,312

11 Claims. (Cl. 136—107)

This invention relates to a primary dry cell and with more particularity a primary dry cell wherein an alkaline electrolyte is employed.

The conventional dry cell, frequently called the "Leclanche" cell has been used for many years with quite satisfactory results in numerous fields of use of which one of the most common is in flashlights. There are, however, certain disadvantages which are inherent in the Leclanche type dry cells. They are conventionally made in cylindrical form. They have relatively short life when used under heavy drains. There has, for many years, existed a field of use and a potential demand for a dry cell battery which is not limited to the cylindrical shape of the Leclanche type cell and which has the properties of longer life or greater capacity even at relatively higher drains than can be satisfied by the Leclanche type dry cell. Somewhat more recently there has been a potential demand for a type of dry cell which can be assembled into a battery formed of multiple cells and which, when assembled, does not suffer from the unwieldy size, the space-wasting cylindrical shape and the limited life or low capacity of the Leclanche type dry cell. This more recent potential demand relates to cells used in portable hearing aids, portable radios, and like miniature equipment.

The history of this art suggested that some of the disadvantages of the Leclanche type dry cell could theoretically be overcome by utilizing an alkaline electrolyte in place of the electrolyte conventionally used in the Leclanche type cell. The earliest efforts along this line were directed toward alkaline wet cells, but such cells have at most very restricted uses. They are not readily portable and can only be operated in a fixed position, a factor which makes them incapable of being used in portable electrical equipment.

The history of the art also reveals that in the period from about 1890 to about 1920, many workers in the art, particularly foreign workers and more particularly German or Swiss inventors, took out patents on various forms of alkaline dry cells as improvements on the Lalande cell. So far as I am aware, these prior, relatively ancient, patents were never followed by the commercial production within or importation into the United States of satisfactory alkaline dry cells. Somewhat more recently, United States patents have been taken out on alkaline dry cells which, on first inspection, appear to have marked advantages over either the Leclanche type or Lalande type dry cells but which when subjected to use are found to have some very appreciable disadvantages. An example of the type of more modern alkaline dry cell is disclosed in United States Patent No. 2,422,045 to Ruben. The cells disclosed in this patent have certain basic disadvantages:

The depolarizers employed, including $Ag_2O$, $HgO$, and $CuO$, are expensive and markedly increase the cost of production. The construction employed is complicated and does not lend itself readily to mass production, likewise greatly increasing the costs of production. Recognizing the corrosive nature of the electrolyte, efforts have been made to reduce the possibility of electrolyte damage by placing the cell contents in a steel cup, or can, and sealing into the upper surface of the can an insulated metallic cover. Since the can, or cup, functions as one of the cell terminals, while the metallic cover functions as the second cell terminal, both cell terminals are in effect disposed at the same end or side of the cell. This construction makes it difficult to superimpose one cell upon another so as to create a multiple cell battery, because extra connectors and insulating members are required between each pair of adjacent cells. The chemicals selected for depolarizer materials and the other chemically active ingredients in the cell, are prone to generate gas after discharge. The uncontrolled generation of such gas raises the possibility of explosion or leakage of the caustic electrolyte and, sometimes, liquid mercury. The overcoming of this disadvantage requires going to further extra cost in the construction of the cell or in the use of additional expensive depolarizer. The creation of an effective insulating seal between the steel cup and the metallic top plate requires an expensive grommet and even when this expense is incurred, the danger of leakage of electrolyte is not eliminated. The cells most generally are characterized by having an abrupt voltage drop near the end point; thus a user has virtually no warning that the battery is approaching the end of its useful life. Notwithstanding their expense, the depolarizers suggested in these recent patents are at least slightly soluble in alkaline electrolyte and are capable of causing serious degrading effects in the cell. There is also the danger of deposition of foreign material such as metallic copper on the zinc anode, thus stimulating excessive corrosion of the zinc. Efforts have been made to avoid such deleterious results by incorporating in the cells barrier elements to augment the cellulosic spacer elements. Even when barriers are used, the internal malfunctioning of the cell is not entirely eliminated. Where, as is recommended, an absorbent or spacer material is employed, there is a distinct danger of oxidation and resultant degradation of the cellulosic spacer materials.

The present invention contemplates an alkaline dry cell which is not only designed to overcome the disadvantages briefly mentioned above, but which, for the first time, will make available for mass production and reliable usage a primary alkaline dry cell which will satisfy the following objectives:

A dry cell with high capacity per unit volume. A dry cell so constructed as to have its terminals at opposite ends (or sides) of the cell, thus making quite simple the construction of multiple cell batteries. A dry cell of such size and shape as to permit the construction of multiple cell batteries which will not be cylindrical in overall shape, or if constructed as cylindrical batteries, will have battery dimensions which will be a mere fraction of the overall dimensions of a Leclanche type battery of equivalent capacity. A dry cell which has virtually no leakage of electrolyte or other materials after discharge, or during discharge. A dry cell in which the gas generation is so minimized, both during and after discharge that no provision need be made for venting the cell, with the increased danger of electrolyte leakage which accompanies such vents. A dry cell in which such gas as is generated is in amounts so small that the generated gas may be confined within the interior of the cell and when so generated, at most has a tendency to expand, very slightly, the end terminals of the cell, thus increasing desired cell-to-cell contact in multiple cell batteries. A dry cell with a gradual voltage drop near the end point so that the need of replacement is indicated to the user. A dry cell with a depolarizer which is not only cheap but is formed of ingredients which are almost completely insoluble in alkaline electrolytes, thus, eliminating the harmful effects on any absorbent material, and on the zinc anode, which have characterized prior art alkaline cells. An alkaline dry cell which does not require the use of an expensive grommet and which does not require the use of a barrier between the depolarizer and any absorbent used. A dry cell which is capable of withstanding relatively high drains and which under abnormal drains possesses longer life and greater capacity than prior art dry cells of either the Leclanche type or the Lalande type.

The foregoing objects are attained and the disadvantages of prior art dry cells are overcome by the alkaline dry cell which is the subject of this application. In the accompanying drawings, which illustrate one embodiment of the invention, like reference numerals refer to like or similar elements:

Figure 1 is a composite side elevational view, in cross-section, of the various elements of the cell and wherein the elements are unassembled.

Figure 2 is also a composite side elevational view, in cross section, of the partially assembled positive sub-assembly and the partially assembled negative sub-assembly, the two sub-assemblies being arranged in the manner in which they may be brought together for final assembly.

Figure 3 is a side elevational view in cross-section of the assembled cell.

Figure 4 is an exterior view of the assembled cell taken from a position to one side and slightly above the cell.

Figure 5 is a detail view of one of the caps, useable on either end of the cell, as viewed from a position to one side and slightly above.

Figure 6 is an interior plan view of the cap shown in Figure 5.

Figure 7 is a detail view of one of the pellet cups taken from a position to the side and slightly above.

Figure 8 is an interior plan view of the pellet cup shown in Figure 7.

Figure 9 is a detail view of the insulating spool taken from a position to the side and slightly above.

Figure 10 is a vertical plan view of the insulating spool shown in Figure 9.

Figure 11 is an interior plan view of the cap, similar to Figure 5, but having positioned thereon the pellet cup.

Referring more particularly to Figures 1 and 2 of the drawings, the cell of the present invention is provided with the following component parts: a positive metallic cup 1 and a negative metallic cup 2; a substantially cylindrical insulating spool 3; a metallic pellet cup 4; a mass of depolarizer 5, which is preferably in the form of a preformed pellet; a pair of seals or gaskets 6 and 7 which assist in obtaining a good cell closure; a zinc disk or wafer 8, and an electrolyte carrier 9 which may be a porous wafer or gel.

Desirably, the positive cap 1 should be inactive, or at least passive, in contact with an alkaline electrolyte. Plain steel, or stainless steel having more or less chromium content, or nickel plated steel are suitable materials since such materials have the required strength and rigidity when employed in metal of the required gauge thickness. Ordinary steel is preferred because of its cheapness. It is desirable that the material used in the positive cap be resistant to any chemical action from the depolarizer alone, or from the depolarizer when in contact with an alkaline electrolyte.

The negative cap 2 may for some purposes be formed of ordinary steel as was the case of the positive cap. Preferably, however, the negative cap should be formed of a metal which is compatible with the zinc anode so that undesirable corrosion of the zinc anode is not caused by contact with the negative cap. Tin plated steel has been found to be a very suitable material for the negative cap.

The tin may be applied to the steel either by a hot dip process or by electro-plating. Even further improvement can be had, in some cases, by amalgamating the tin plate of the negative cap either before assembly or after the cell has been completely assembled. Negative caps made entirely of zinc, or of cadmium coated steel, have been successfully used. Where ordinary steel has been used, it has been found desirable to take some precautions against unwanted corrosion of the zinc anode. One precaution which may be taken is to employ an auxiliary thin disc of zinc, inside of the negative cap, to separate the zinc anode from the surface of the steel cap. It has been found preferable to avoid the use of such an auxiliary zinc disc wherever possible since the disc is likely to become amalgamated by any mercury which migrates from the zinc anode. The embrittlement resulting from such amalgamation has a tendency to cause the zinc disc to crack and create the possibility of leakage of electrolyte. This same relative disadvantage exists when zinc is used for the negative cap.

With respect to both the positive cap 1 and the negative cap 2, it is desirable to have the caps formed of a metal which has both the requisite inherent strength and sufficient thickness so as to be strong enough to resist any expansion caused by internal pressure generated within the cell, while still having some flexibility. At the same time, the caps should be strong enough to retain a firm grip on the flanges of the insulating spool. Ordinary steel meets these requirements as to strength, but at the negative cap there are additional problems to be considered.

When the negative cap 2 is made from ordinary steel, there is usually considerable corrosion of the zinc in contact with the steel which is caused by the electrolyte solution. It is believed there is a possibility of the formation of local couples between the zinc and steel, or between impurities in the steel and the steel itself which, if formed, would be disadvantageous. Another disadvantage in the use of ordinary steel is in the somewhat poor electrical contact which is obtained between the zinc anode and steel cap. Zinc and zinc oxide have no great affinity for steel, so that electrical contact is achieved only where there is physical contact between the electrode material and steel casing. This physical contact may be increased by the pressure caused by crimping the caps around the insulating spool, and its contents, and by external pressure, if any. I have found that when the interior surface 15 of the negative cap is tin, or alloys of tin or tin amalgam, many of these difficulties are eliminated. If a steel or nickel-plated steel cap is used, tin plating on the inner surface gives improved cell performance. The tin may be applied to the steel in any known manner. The hot dip process and electro-plating are equally satisfactory. The tin surface appears to overcome many of the disadvantages of ordinary steel discussed above. While I do not fully understand why the tin surface produces desirable characteristics and overcomes the disadvantages of using ordinary steel, my experience with the tin-surfaced caps has led me to form a theory, which may explain the improvements. For instance, if tin-plated steel is used, the tin plating apparently protects the zinc of the zinc anode in contact with the cap from corrosion by the electrolyte solution. The tin plating is believed also to eliminate, to a large extent, the formation of local couples within the negative cap assembly. A further advantage of the tin surface may be due to the fact that tin readily amalgamates. Hence, any free mercury which has migrated from the electrode should combine with the tin rather than merely remaining as metallic mercury in the cell. This amalgam formation may cause better electrical contact, since usually any two amalgams will have affinity for each other, and if some free mercury is present, both surfaces will be wetted, thus producing an excellent electrical contact.

Whatever may be the reason for the superiority of the tin surface, it does produce a superior cell. It is not necessary to use a tin-plated steel. A solid tin cap would perform equally well and would be strong enough to serve the purpose. Any conductive material of sufficient strength, with a tin plating on the inner surface, could be used. Thus, conductive rubber or other conductive plastics, with a tin coating on the inner cap surface, would serve the purpose. Regardless of the cap material used, the tin or tin alloy surface may be amalgamated and similar desirable cell characteristics will be obtained.

Other types of structure for the tin-surfaced negative cap may be used. For instance, if a steel cap is used, it may be lined with tin foil, with the same good results. The use of a tin disk also produces good results. It is desirable to avoid, however, any metal in the cap which might cause local couples. If tin-plated steel caps are used, the tin plating may be applied to all caps, for both positive and negative use, for the purpose of standardizing parts, if that seems desirable. The tin coating on the positive cap would be an added, unnecessary expense, however.

I have also discovered that even further improvement in the cell characteristics and performance may be achieved when the tin surface is polished as by remelting the tin or by freezing the tin as it is deposited by a hot dipping process. One of the improved results obtained by a polished tin surface is increased resistance to electrolyte leakage, particularly where the cell employs an alkaline electrolyte. Where, as described elsewhere in this specification and in the specification of my copending application Serial No. 103,593, filed July 8, 1949, now United States Patent 2,650,945, issued September 1, 1953, an elastomeric gasket or adherently attached sealing ring 6 is positioned and compressed between the end of the insulating spool 3 and the inner face of the terminal cap, 1 or 2, the tin surface greatly increases the reliability of the seal and resistance to electrolyte leakage and creepage. These results are even further enhanced when the tin surface is polished and has a relatively high luster. While the theoretical reasons for this improvement are not necessary to a full understanding of this invention, I believe that the unpolished matte finish while theoretically providing longer paths for creeping electrolyte does not eliminate electrolyte leakage due to surface tension effects as efficiently as does a polished or mirror surface.

The insulating spool 3 must be of such composition that it will be resistant to attack from a strong alkaline electrolyte and from any product of any chemical reaction occurring within the cell. It must also be sufficiently rigid so that it retains its shape and dimensions at all ordinary temperatures. It must be a non-conductor. While glass or other ceramic materials may be employed in the forming of the insulating spool, preferably a spool formed of a synthetic plastic composition is employed. A material which has the advantages of relative cheapness and which may be easily fabricated by injection molding or by machining or grinding from tubular stock has definite advantages in reducing the difficulties and costs of forming the insulating spool. Polystyrene is a suitable insulating plastic which has all of the desirable properties mentioned above. The insulating spool 3 may vary somewhat in shape but a preferred form is that of a spool or cylinder having a cylindrical inner bore bounded by an inner wall 16. A considerable portion of the wall 19 of the insulating spool is relatively thin; this is the intermediate portion. The upper and lower peripheral edges 17 and 18 of the spool are thickened and extend as flanges or shoulders beyond the surface of the outer wall 19 of the spool. These flanges may be formed with angular corners or the corner edges of the flanges may be somewhat rounded. The top annular surface 20 of the spool and the bottom annular surface 21 of the spool are desirably smooth and flattened for a purpose which is to be explained later.

Reverting to the positive cap 1, it will be observed that the cap has a marginal wall 10 which extends outwardly at an angle from the main horizontal plane of the cap top 31. The cap top is desirably circular and has a flat outer surface 12 and a flat inner surface 11. Desirably, the marginal periphery of the wall 10 is crimped or fluted as shown at 33. While the negative cap 2 may differ in actual form from the positive cap 1, it is desirable from the viewpoint of manufacturing economy to form it identically with the structure of positive cap 1. Thus, the negative cap 2 has a side wall 13, and a flat circular central portion 32 which has a flat outer surface 14 and a flat inner surface 15. The marginal edges of the side wall 13 may be suitably crimped or fluted as shown at 34. The inner diameters of the inner surface 11 of the positive cap 1 and the corresponding inner surface 15 of the negative cap 2 are desirably identical with, or deviate but slightly from, the greatest diameter of the insulating spool, at a top surface 20 and a bottom surface 21 thereof.

The pellet cup 4 is preferably made of the same material as the positive cap 1. It is desirable that the pellet makes efficient electrical contact with the positive cap 1 in order to keep the internal resistance of the cell at a low value. This objective can be accomplished by providing small projections on the top surface 24 of the pellet cup, or by embossing small projections on the inner surface 11 of the positive cap. It is preferred, however, to weld the top surface 24 of the pellet cup to the inner surface 11 of the positive cap. Spot welding has proven to be a very quick and satisfactory method for joining the pellet cup and positive cap in the desired relationship as to position and efficient electrical contact. It is even possible to provide a joint by soldering, but welding is preferred since a surer contact is established and no foreign metal is introduced as would be required by soldering. The cup has a flattened surface which presents a circular exterior top 24 and a circular interior bottom 22; annular marginal wall 23 is preferably at substantially right angles with the plane of the cup bottom. The exterior diameter of the pellet cup is necessarily somewhat less than the diameter of the positive cap and preferably is almost identical with the inner diameter of the bore of the insulating spool formed by its interior wall 16. The marginal wall 23 of the pellet cup will be somewhat higher, or longer, than the marginal wall 10 of the positive cap and, in turn, will be somewhat shorter than the axial length of the bore of the insulating spool 3.

The depolarizer pellet is preferably formed of an intimate mixture of finely divided manganese dioxide and graphite. It has been found desirable to preform the mixture by pressing the mixed components into the form of a pellet, (the compression being carried out under high pressure) and then inserting the pellet into the internal recess of the pellet cup. It is preferred to adjust the thickness of the depolarizer pellet so that it rests slightly below the outer rim of wall 23 of the pellet cup. It is difficult to insert the depolarized pellet into the pellet cup, while having the exposed surface of the depolarizer pellet flush with the outer marginal rim of wall 23, without experiencing some chipping along the edges of the depolarizer pellet. The loosening or detaching of fragments of depolarizer caused by such chipping may cause some internal shorts, a result which is avoided by adjusting the thickness of the pellet so the pellet is recessed within, and does not occupy the entire capacity, of the pellet cup.

A suitable seal, which may be a washer or gasket in the form of an annulus 6, is provided for insertion within the recess of the negative cap 2 and for placement parallel to and adjacent the inner surface 15. Desirably, if a washer or gasket is utilized, the bore of this element will have a diameter closely approximating the inner diameter of the insulating spool 3 and the effective body of the seal or gasket will be wide enough so as to extend substantially coextensively with the bottom annular surface 21 of insulating spool 3. A similar seal 7 is desirably provided for placement adjacent the inner surface 11 of positive cap 1. This seal, if it be a gasket or ring, should preferably have a bore the diameter of which is substantially the same as the outer diameter of the pellet cup 4. The effective body of the seal, if it be a gasket or ring should be wide enough to extend substantially coextensively with the top annular surface 20 of the insulating spool 3.

The zinc anode 8 may be used in several forms but in any form used is preferably amalgamated to a considerable degree. It is possible to used a circular zinc plate of appreciable thickness, or a plurality of parallel thin zinc discs. Where the anode is made of coherent zinc in the forms discussed just above, a somewhat lower order of amalgamation is preferable since less mercury is necessary to depress the rate of solution of the zinc in the electrolyte. Desirably, however, the zinc anode is prepared in the form of a zinc wafer, pellet, or disc fabricated by amalgamating zinc powder and then pressing the amalgamated zinc powder into the form of a pellet utilizing moderate pressures. This produces appreciable porosity within the body of the pellet and increases the ability of the pellet to absorb some electrolyte. The zinc powder should be of relatively high purity and particular care should be taken to see that it is free from metals such as nickel, cobalt, or iron which are passive in an alkaline electrolyte. The amount of mercury required in amalgamation varies somewhat depending upon the method used in the amalgamation and the ultimate area of the zinc anode which is to be exposed to the electrolyte. By "ultimate area," it will be understood that reference is made not only to the true external surface area, but to the internal surface area of voids within the pellet. In general, the amount of mercury used depends somewhat on the exact electrolyte used, but in most cases from about 5 per cent to about 15 per cent of mercury, by weight, with about 95 per cent to about 85 per cent of zinc, by weight, produces a suitable zinc pellet. Whether a coherent zinc plate or a compressed powdered zinc pellet is used, the anode is preferably formed in the shape of a thin flat circular disc which has an exterior diameter very slightly less than the diameter of the interior bore of the insulating spool 3.

The electrolyte carrier 9 may be a gelled electrolyte. Preferably, however, a porous wafer is employed. This wafer should be formed of a highly porous material capable of absorbing and holding the electrolyte. It must also be capable of acting as a resilient spacing element so as to insure the physical separation of the zinc anode 8 from the depolarizer pellet 5. The wafer should have a high degree of moisture retentiveness while being expanded or contracted by forces operating within the cell—thus it should not be readily deprived of absorbed electrolyte when compressed. The porous wafer should be highly resistant to chemical decomposition such as might be generated by an alkaline electrolyte. Ordinary paper and some forms of cellulosic materials have been tested but have been found to possess a tendency toward shrinkage upon continued exposure to alkaline electrolyte. This shrinkage is probably caused by chemical change rather than purely physical change in the structure of the cellulosic fibers. This tendency has been overcome by employing such materials as finely porous cellulose sponge or by pads made of loose absorbent paper composed of cotton fibers. As stated above, the electrolyte can also be in the form of a gel electrolyte. A precast or pre-cut wafer of gel may be used. It is possible to use a film which swells to a gel when the electrolyte is added. It is also possible to combine, as a laminate or impregnate, a gel and a base such as a cellulosic wafer, so as to obtain the advantages of both gelled electrolyte and porous wafer.

There are several suitable gelling agents but sodium carboxymethylcellulose has been found to give good results since it is quite stable in the presence of the concentrated alkaline electrolyte and an adequate gel can be formed with but small amounts of the compound.

The electrolyte, as such, does not appear as an element in the drawings. The electrolyte may be essentially a water solution of an alkaline hydroxide, preferably sodium or potassium hydroxide or a mixture thereof. A satisfactory cell constructed in accordance with this invention can be produced with a potassium hydroxide or sodium hydroxide (or a mixture of the two) electrolyte solution. Certain variations are permissible, although the use of such variations insofar as they involve substitution for potassium hydroxide or sodium hydroxide, are not preferred. Thus, lithium hydroxide or even alkaline earth hydroxides may be employed in the form of solutions as the electrolyte. While the use of the more common potassium or sodium hydroxides alone produce satisfactory results, even better results are obtained by careful control of the concentration of the electrolyte solution and by modifying the alkaline hydroxide electrolyte solution by adding zinc oxide, dissolved in the electrolyte as zincate. When the zinc is added to the electrolyte in the form of zinc oxide there is produced a solution of the zincate of the alkaline metal, present in the electrolyte as hydroxide. For example, where the electrolyte comprises a solution of potassium hydroxide and zinc oxide is added to the solution, zinc oxide reacts with some of the potassium hydroxide to form potassium zincate in the solution. When so added, the chemical reaction by which the zincate is formed is reversible. It has been found, contrary to prior art teachings, that the amount of dissolved zinc oxide required for beneficial results varies inversely with the concentration of the electrolyte. The more concentrated electrolytes require less dissolved zinc oxide and produce an electrolyte characterized by a practical minimum rate of gas generation; they are, however, relatively more viscous and less conductive. The less concentrated electrolytes have greater conductivity, are somewhat easier to distribute within the cell and require larger quantities of dissolved zincate. In general, the zinc oxide added to form the zincate in solution is a minor fraction of the amount of zinc oxide required to form truly saturated solutions of zincate in the electrolyte. As an example, a suitable electrolyte may be composed by using 100 parts, by weight, of potassium hydroxide, 100 parts, by weight, of water, and 5 parts, by weight, of zinc oxide. The electrolyte solution is formed by using chemically pure potassium hydroxide, containing 85 per cent or more potassium hydroxide, computed on a dry basis, dissolving the potassium hydroxide in sufficient water to form a solution, dissolving the desired amount of pure zinc oxide in this solution, using heat if necessary to insure complete solution of the zinc oxide, and then adding make-up water to give the desired relative amounts of water, dissolved potassium hydroxide and dissolved potassium zincate.

Mode of assembly

The alkaline dry cell, described above, may be assembled by carrying out the following sequential steps. It will be understood that in general, the cell may be considered to consist of four sub-assemblies. These are the positive sub-assembly, the insulating spool, the electrolyte carrier, and the negative sub-assembly.

Starting with the positive sub-assembly, the pellet can 4 may be spot welded to the positive cap 1 in such a manner that the pellet can is properly centered on the interior face of the positive cap. Next, the depolarizer mix is pressed or formed into a pellet 5 which is preferably of substantially the same dimensions as the interior of the pellet can. Desirably, the depolarizer pellet is moistened during formation, or immediately after it has been pressed within the pellet can, and is then subjected to compression so as to tamp the pellet firmly and solidly in place within the pellet can. Desirably, as a result of these operations, the outer surface of the depolarizer pellet will lie very slightly below the outer edges of the pellet cup.

Starting with the negative sub-assembly, the negative cap 2 has placed on its inner face an annular gasket 6, or the inner face may be coated near its periphery with a sealing compound, so as to provide a seat for one end of the insulating spool. Where a sealing compound is used, it is desirable to coat the appropriate end of the spool, in preference to the inner face of the negative cap. The insulating spool 3 is then placed on the gasket or on the surface of the interior face of the negative cap 2 and the edges of the negative cap are then crimped over the outer lip 18 of the insulating spool. Desirably, the crimping operation should be conducted under pressure so that the bottom annulus 21 of the insulating spool is firmly urged against the interior face 15 of the negative cap and held tightly in this position during and after the edges of the cap are crimped. Thereafter, the zinc pellet or disc 8 is dropped into the hollow bore of the insulating spool in such a manner that the juxtaposed faces of the zinc pellet and the negative cap are in contact. Desirably, the zinc pellet will be lightly tamped on or pressed into place in a manner somewhat similar to the tamping of the depolarizer pellet in the depolarizer pellet can. Thereafter, the absorbent wafer 9 is dropped into place immediately over the zinc pellet and within the bore of the insulating spool. The top, or open end, of the insulating spool may then be coated with a sealing compound and additionally, or alternatively, a ring gasket 7 may be placed within the positive cap in the annulus between the depolarizer cup side wall 23 and the positive cap side wall 10.

With the positive sub-assembly having been prepared as indicated above, and the negative sub-assembly having been prepared with one end of the insulating spool crimped in position within the negative cap the two sub-assemblies appear as shown in Figure 2. The required amount of electrolyte is then metered into the open end of the bore of the insulating spool in the negative sub-assembly. The metered amount of electrolyte is absorbed by the absorbent wafer and the subjacent zinc pellet in the negative sub-assembly. The positive sub-assembly is then turned over so that its inner face is opposed to the inner face of the negative sub-assembly, the depolarizer pellet can is slid into the bore of the insulating spool and sufficient pressure is exerted so that the, as-yet-unsealed, open end of the insulating spool presses firmly against the seal or gasket 7 in the annulus between the pellet cup and the positive cap. While being held together under this pressure, the edges of the positive cap are crimped firmly around the upper lip of the insulating spool.

The positive and negative sub-assemblies of the cell are now insulated from each other by the insulating spool yet are each held firmly in position by having the positive cap 1 and negative cap 2 both crimped around the lips of the insulating spool. The marginal ends of the insulating spool are sealed within the caps and to the interior faces of the negative cap and the positive cap respectively. Within the cell, the depolarizer pellet, held in position within the depolarizer pellet can or cup, is in physical contact with the absorbent wafer and the absorbent wafer is in physical contact with the zinc pellet. The zinc pellet is in conductive contact with the negative cap and the electrolyte-wet absorbent wafer. The depolarizer pellet is in electrical contact with the electrolyte-wet absorbent wafer and, through the depolarizer pellet can or cup, is in electrical contact with the positive cap.

Certain modifications in the foregoing sequential steps may be employed. Thus, in preparing the positive sub-assembly, it has been found that instead of prefabricating a depolarizer pellet from the mixture of depolarizer compounds and then moistening the preformed pellet, either before or after insertion into the depolarizer pellet can, it is possible and in some cases desirable to meter a desired amount of loose depolarizer mix directly into the pellet can and then by placing the mix under pressure, consolidate the mix into a pellet formed in situ in the depolarizer pellet can. Where the depolarizer pellet is preformed, it is preferable to pre-wet the mix with electrolyte before inserting the pellet into the depolarizer pellet can. It has also been found desirable in some instances to insert the depolarizer pellet into the can or form the pellet in situ within the can, as explained above, before the depolarizer pellet can is welded to the positive cap. Thus, the depolarizer cup may first be welded to the positive cap and then filled with the depolarizer or the depolarizer cup may be filled with depolarizer and the filled cup then welded to the positive cap.

In the negative sub-assembly, certain modifications may be employed. In some instances, the use of a gasket ring as a seal or seat for the negative end of the insulation spool has been resorted to without any supplemental treatment. In general, however, it is preferred either to augment the gasket, with a sealing compound or to replace the gasket with one or more types of sealing compound. Where a gasket is employed, it may be a ring or washer made of natural or synthetic rubber. Certain synthetic compounds having the properties of rubber, such as neoprene (chloroprene) or Hycar (Buna N or nitrile rubber) have been found to give excellent results under severe tests. Where the gasket or washer is replaced, or supplemented, it has been found that a thin film of material which possesses both resiliency and adhesion may be coated or applied to the end of the insulating spool. Suitable compounds for this seal may contain water dispersions or latices of either natural or synthetic rubbers. However, other suitable compounds exist and may be applied, either as solutions in suitable organic solvents, or as liquids which have been heated to give the desired viscosity and film forming properties when hot and which when cool will possess the desired sealing characteristics of resiliency and adhesion. Hot melt formulations containing plastics, certain of the microcrystalline waxes and silicones having the properties which I have mentioned above have demonstrated their ability as sealing compounds to stand up successfully under many test conditions.

It is, however, recognized that dry cells may be subjected to use under very rigorous conditions far beyond the normal contemplated usage. To safeguard against failure under extreme conditions of usage, it may be desirable to augment a given sealing compound by the application of a second coating of a different nature. This may be applied on both the positive and the negative caps of the cell or may be employed only at the negative end of the cell. For such secondary sealing compounds, hydrocarbon, or petroleum hydrocarbon derivatives, such as petrolatum or a lubricating oil may be utilized. It is also possible to utilize, either mixed with, or in place of, such petroleum compounds, a rust inhibitor compound, such as barium salts of sulphonated alicyclic acids. In view of the recognized solvent properties of hydrocarbon oils on natural rubber, where an essentially oily compound is used as a secondary sealing compound, it is advisable either to use for the gasket one of the synthetic rubbers, such as chloroprene or nitrile rubber or Buna N, which have more resistance to oils and greases, or to replace the gasket with a hot melt or silicone primary seal.

In the modification shown in the drawings, the top and bottom marginal edges 20 and 21 of the insulating spool are flat over their entire areas. Under some circumstances it is desirable to notch or cut away the peripherial edge of the bottom surface 21, and in some cases the top surface 20 as well. The notching of the edge, or edges, on the plastic spool provides an annular seat which will accommodate a gasket, or a ring, of slightly greater internal diameter than the ring shown as 6 in Figure 1. The advantage of this modification is that the gasket or ring has a vertical seat as well as a horizontal seat against the insulating spool.

*Preparation of materials*

The details of the preparation of the depolarizer pellet and of the electrolyte are set forth in my copending application, Serial No. 103,593, filed July 8, 1949. For best results, the mode of preparation therein described should be followed carefully. However, the basic improvement described and claimed in the present application is the tin-surfaced negative cap. This improvement may be adapted for use in any alkaline cell, and therefore, it is not necessary to follow the preparation method described in my copending application to derive the benefit of my prevent invention. Any alkaline electrolyte and suitable depolarizer and anode may be used to advantage with my improved cell structure.

*Mode of operation*

The use of the tin-surfaced end cap does not change the basic mode of operation of the cell. If the disclosure of my copending application, Serial No. 103,593, is followed, the cell system remains $Zn/KOH/MnO_2$. The tin surface is a structural feature rather than an operational feature. Any alkaline or equivalent system may be substituted for the system disclosed in the copending application, and the advantages flowing from the use of the tin surface will still accrue.

This application is a continuation-in-part of my copending application, Serial No. 103,593, filed July 8, 1949, now U. S. Patent No. 2,650,945, issued September 1, 1953.

I claim:

1. A primary dry cell comprising a pair of conductive caps, each of said caps having side walls crimped downwardly and inwardly around the respective opposite ends of a hollow-bored, substantially rigid insulating spool, the side walls of which are imperforate, the said conductive caps being insulated from each other by said spool, the caps and spool forming a sealed interior compartment, and within said sealed interior compartment and in electrically conductive contact therewith, electrodes, and an electrolyte, and a tin surface on one cap in conductive contact with the negative electrode of the cell.

2. A primary alkaline dry cell comprising a pair of conductive caps, each of said caps having side rims crimped downwardly and inwardly around the respective opposite shouldered ends of a hollow, cylindrical, substantially rigid insulating spool, the side walls of which are imperforate, the said conductive caps being insulated from each other by the spool, the caps closing the spool and forming a sealed interior compartment therein, and within said sealed compartment, positive and negative electrodes, one of said conductive caps being in conductive contact with the negative electrode and comprising the negative cell terminal, said negative terminal comprising two elements, the first of which is a structural cap having strength to perform the closure function, the second of which comprises a tin surface, which surface is the only part of the cap which is in contact with the negative cell electrode.

3. A primary dry cell comprising a sealed body formed from a hollow, cylindrical insulating spool which is sealed at each end by conductive cap terminals, and within said sealed body a negative electrode which substantially fills a cross-sectional area in the spool, said negative electrode being in conductive contact with the cell electrolyte, and with a portion of the negative cap terminal, said portion being selected from the group consisting of tin, tin alloys, and tin amalgam.

4. The primary dry cell of claim 3 in which the negative electrode is zinc.

5. The primary dry cell of claim 3 in which the negative electrode is amalgamated zinc.

6. A primary dry cell comprising a pair of conductive metallic caps, each of said caps having side walls crimped downwardly and inwardly around the end sides of a hollow bored, substantially rigid insulating spool, the side walls of which are imperforate, the side ends at each end being shouldered, the said metallic caps having flat exterior end faces adapted to provide flat cell terminals, insulated from each other by said spool, of substantially equal shape and size, and having flat interior faces which completely cover the ends of said hollow bore, thereby forming a sealed interior compartment, electrodes, electrolyte and depolarizer within said sealed interior compartment, and in electrically conductive contact with said metallic caps, and one of said caps being formed of steel coated on at least the interior face thereof, with tin.

7. A primary dry cell comprising a sealed body and comprising a hollow insulating spool, cell reactants comprising negative and positive electrodes and electrolyte within said spool, conductive metallic cap terminals at each end of said spool and in conductive relationship with said cell reactants, the negative cell terminal cap being in conductive contact with the negative electrode by means of an interposed surface formed from the group consisting of tin, tin alloys and tin amalgams.

8. The primary dry cell of claim 7 wherein an elastomeric sealing ring is interposed between the end of said insulating spool and the adjacent cell terminal cap.

9. The primary dry cell of claim 7 wherein the said interposed surface is metallic tin.

10. The primary dry cell of claim 7 wherein the said interposed surface is polished.

11. The primary dry cell of claim 7 wherein the said interposed surface is a polished coat of tin on the inner face of the negative cap terminal and a compressed elastomeric sealing ring is positioned between the end of said insulating spool and the tin surface on the inner face of said negative cap terminal.

References Cited in the file of this patent

UNITED STATES PATENTS

| | | |
|---|---|---|
| 1,302,304 | Burgess | Apr. 29, 1919 |
| 2,422,045 | Ruben | June 10, 1947 |